Feb. 6, 1973  L. G. MEIER  3,714,992
STUBBLE MULCHER DEVICE
Filed Oct. 20, 1969  4 Sheets-Sheet 1

INVENTOR.
LEON G. MEIER
BY *Head & Johnson*
ATTORNEYS

Feb. 6, 1973 L. G. MEIER 3,714,992
STUBBLE MULCHER DEVICE
Filed Oct. 20, 1969 4 Sheets-Sheet 2

INVENTOR.
LEON G. MEIER
BY Head & Johnson
ATTORNEYS

INVENTOR.
LEON G. MEIER
BY Head & Johnson
ATTORNEYS

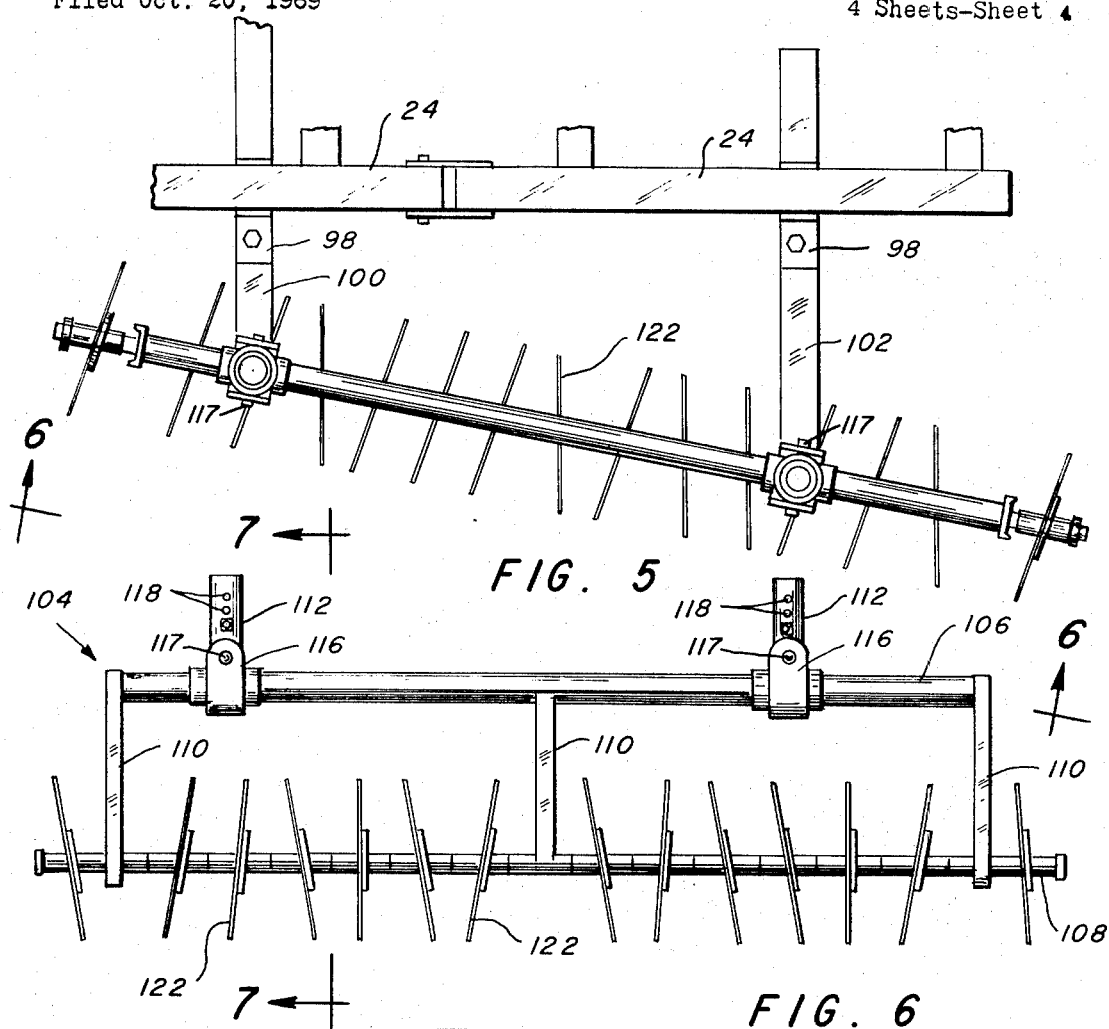
FIG. 5
FIG. 6
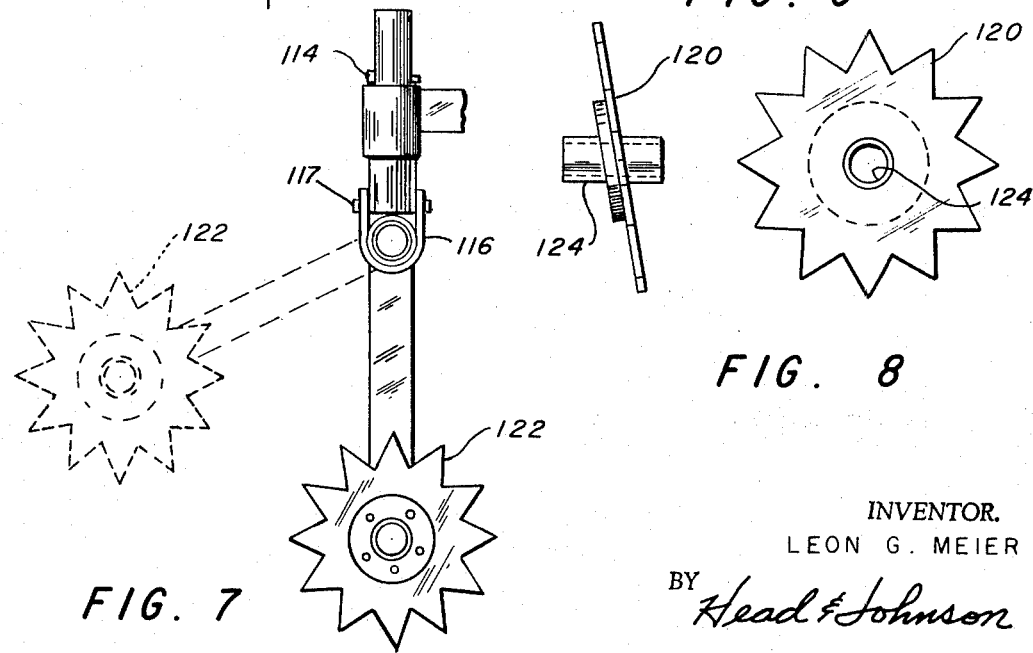
FIG. 7
FIG. 8
INVENTOR.
LEON G. MEIER
BY Head & Johnson
ATTORNEYS

United States Patent Office 3,714,992
Patented Feb. 6, 1973

3,714,992
STUBBLE MULCHER DEVICE
Leon G. Meier, P.O. Box 94, Higgins, Tex. 79046
Continuation-in-part of abandoned application Ser. No. 608,604, Jan. 11, 1967. This application Oct. 20, 1969, Ser. No. 867,603
Int. Cl. A01b 5/00
U.S. Cl. 172—175                                                       2 Claims

ABSTRACT OF THE DISCLOSURE

A sweep blade plow assembly for tilling the soil utilizes V-shape sweep blades operating at relatively shallow depths below the earth's surface. The sweep blades are carried on and supported by a central frame member and side frame members pivotally attached to the central member. The depth of the blade's cut is controlled by wheels attached to the frame members, and vertically pivotal relative to the blade. The wheels on the various sections are interconnected to each other and to a unitary control switch for simultaneous vertical movement. Turnbuckles used in the interconnection permit depth adjustment even when one or more of the pivotal side sections is pivoted upwardly into a vertical inoperative position. Secured to the plow assembly rearward of the blade plows are toothed discs rotatably journaled on a pivotal shaft.

CROSS REFERENCES

This application is a continuation-in-part of my previous application, Ser. No. 608,604 having a filing date of Jan. 11, 1967, and now abandoned.

BACKGROUND OF THE INVENTION

Sweep bladed plows of the V-shape type described in U.S. Pat. 3,256,942, issued June 21, 1966, have been known and have been utilized for cultivating the soil, particularly in an operation described as "stubble mulching" wherein the sweep blade operates at a relatively shallow depth to cut off growing vegetation, such as root stubble and other vegetation on the surface of the ground without burying the stubble. Some patents, such as U.S. Pats. 802,625, issued Oct. 24, 1905; 2,677,321, issued May 4, 1954; 2,762,286, issued Sept. 11, 1956; and 3,180,-429, issued Apr. 27, 1965, are good examples of articulated frame subsurface sweep blade type plows. In many of these prior references, efforts have been made to compensate for irregular contours in the earth's surface traversed by the implements. This compensation has generally been accomplished by dividing the plow assembly into sections which are supported so as to vertically pivot relative to each other. It has been found that in relatively hard ground a twisting or rotary force acts against the side units. This force, being in a plane parallel to the direction of the movement, tends to cause the unattached forward outer corner to move downwardly resulting in the sweep blade digging deeper into the ground and directing a substantial amount of earth toward the center section.

In addition, a common disadvantage of the devices taught in the prior art is that they do not have means for quickly lifting an outer section vertically from a normal horizontal operational position without interfering with the operation of the remaining sections.

The ability to quickly and easily raise the side sections is very important from the standpoint of good operation and also for highway travel. This is especially so where changes in terrain or changes in the size of the area being plowed require different width of coverage. In the prior art, once the outer sections have been pivoted into inoperative vertical position, due to the limitation of design the depth of cut of the blade could not be adjusted.

Present stubble mulching sweep blade assemblies have mounted, rearward of the sweep blades, a plurality of rotatable toothed discs, the aggregate of which is commonly called a "spur treader assembly" which cuts through the upper layer of earth breaking up clods and killing vegetation.

One disadvantage of present spur treader assemblies is the fact that, since the shafts upon which the toothed discs are journaled are non-pivotally attached to the frame thereof, the discs become jammed when they encounter obstructions such as rocks or trash which they cannot cut through. Thus the operator of the sweep blade assembly must stop the tractor, dismount and dislodge the obstruction before continuing the stubble mulching operation. Obviously, this consumes time in a non-productive manner.

Furthermore, present spur treader assemblies have the axis of rotation of the discs fixed relative to the forward movement of the sweep blade assembly and consequently no adjustment thereof is available.

It is therefore an object of this invention to provide a stubble mulching sweep blade plow assembly which overcomes objections to the systems known in the prior art.

It is another object of this invention to provide a sweep blade plow assembly incorporating turnbuckle-like means for interconnecting the depth control adjustment means of the various sections whereby outer sections may be pivoted vertically upright or over the central section without interference to the depth adjustment means.

It is a further object of this invention to provide a sweep blade plow assembly which incorporates spur treaders including anti-jamming means.

BRIEF DESCRIPTION OF THE DRAWINGS

FIG. 5 is a top elevational view of the spur treader portion of the apparatus.
FIG. 6 is a view of the spur treader portion taken along the line 6—6 of FIG. 5.
FIG. 7 is a view of the spur treader portion taken along the line 7—7 of FIG. 6 and showing the relative pivotal movement of the support frame thereof.
FIG. 8 is a side and end view of the toothed discs which are an element of the spur treader portion of the invention.

DETAILED DESCRIPTION OF THE PREFERRED EMBODIMENT

Figure 1:
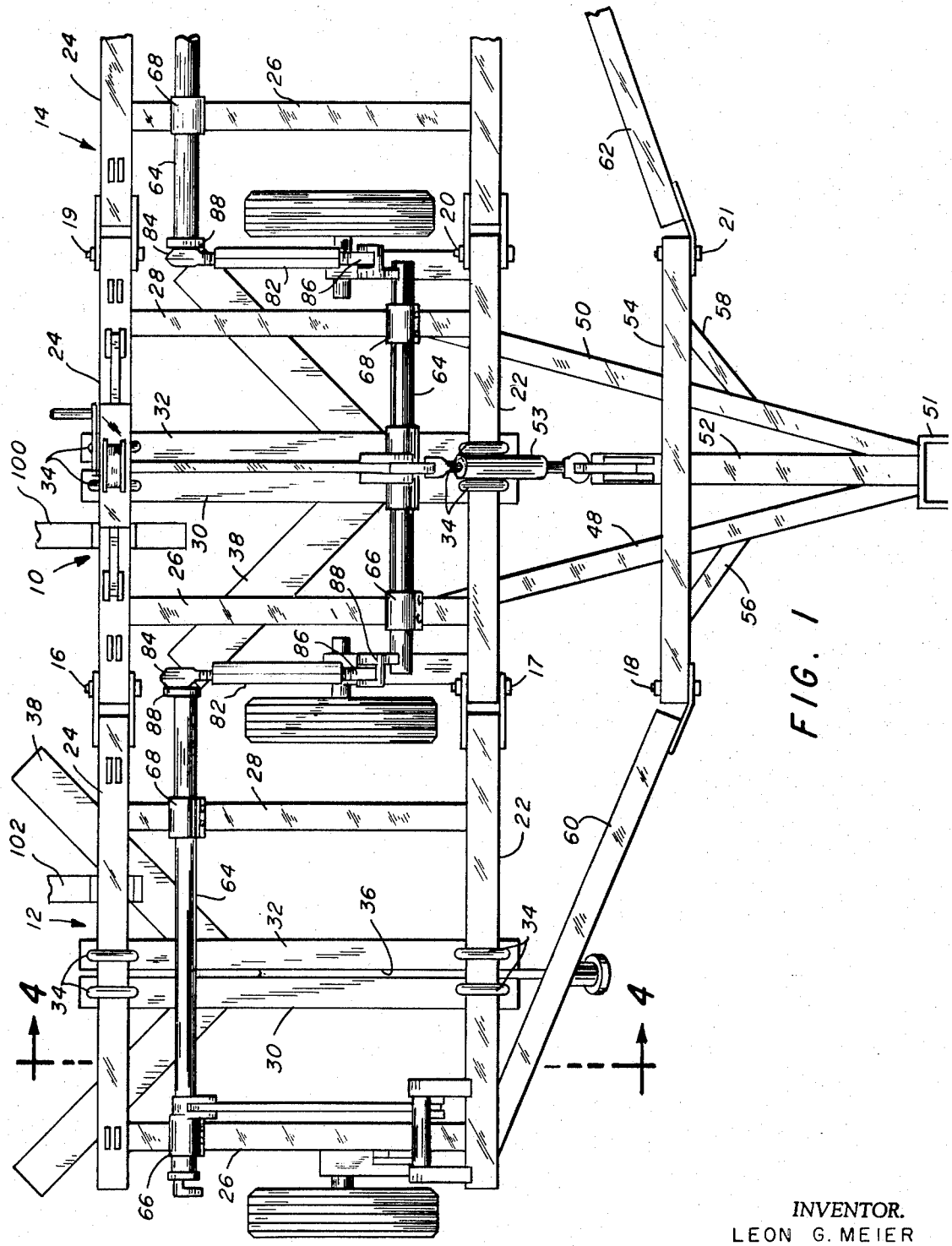
FIG. 1 is a partial elevational view of the apparatus.

Referring now to the drawings and in particular to FIG. 1, the plow of this invention incorporates independent sections extending from a central section generally designated by the numeral 10. The adjacent outer side section 12 is pivotally attached to section 10 by pins 16, 17 and 18; similarly, pins 19, 20 and 21 pivotally attach section 14 to section 10. Since sections 12 and 14 are mirror images of each other, section 14 is only partially shown and the subsequent description of the invention will refer specifically to section 12; however, it is to be understood that statements concerning section 12 apply equally to section 14.

The framework for each section is preferably formed of rectangular or square tubing which includes generally longitudinal members 22 and 24 respectively fore and aft to which transverse cross members 26 and 28 are attached, all of which are in a singular horizontal plane. The structural tubing framework for each section is preferably welded together, although other means of attachment, well known in the art, are inclusive herein.

Extending between structural members 22 and 24, preferably central of cross members 26 and 28, are angle iron members 30 and 32 which are retained to members 22 and 24 by a plurality of U-brackets 34. Preferably, the angle iron braces have one leg within a horizontal plane abutting against the bottom of structural braces 22 and 24 while the vertical legs are adjacent each other and extend downwardly therefrom to provide a gap or space 36 to which a V-shaped plow blade 38 is attached as hereinafter described and, in some instances, a disc or coulter blade forward thereof is provided as will be described hereinafter. The sweep blades are so attached to the angle braces 30 and 32 as to be in staggered alignment somewhat in the manner as shown in FIG. 1.

The hitch for the plow of this invention includes elongated members 48 and 50 are rigidly secured to the central section extending forwardly and inwardly to member 51 which provides hitch connection to a tractor, not shown. Extending rearwardly therefrom and rigidly connected to hitch members 48 and 50 is a support member 52 to which one end of a hydraulic power supply 53 is attached. Transverse to the hitch member is support structure 54 which is rigidly connected to the hitch supporting members 48, 50 and 52. Cross bracing 56 and 58 likewise adds strength and stability thereto. Support members 60 and 62 are rigidly attached to the outer side sections substantially adjacent the outer corner of the forward frame 22 and extend angularly to a pivotal attachment with support structure 54 at shafts 18 and 21, respectively. In particular, members 60 and 62 are to be attached to the forward frame member 22 substantially in alignment with the plane of cross bar members 26.

Figure 3:
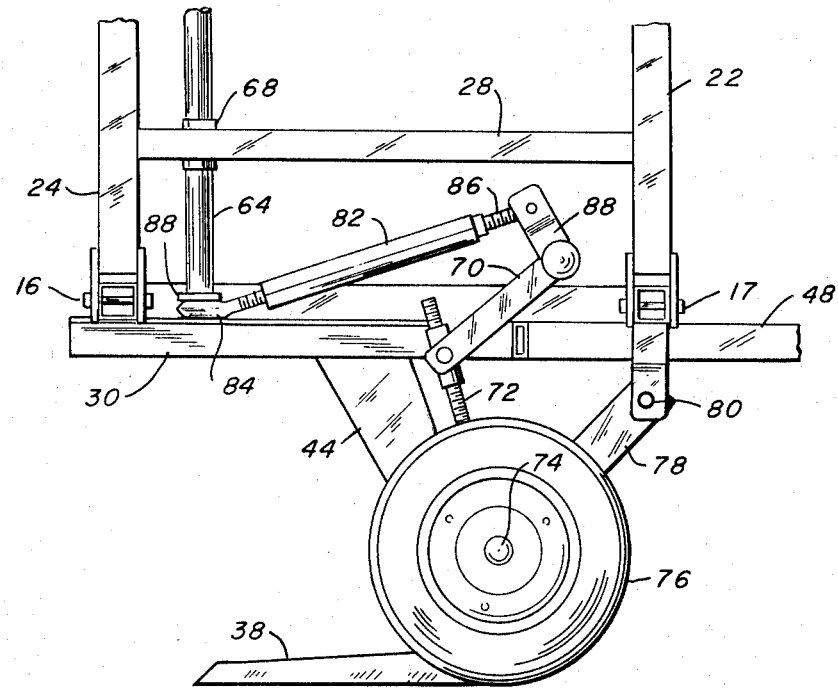
FIG. 3 is a partial cross-sectional view of the apparatus taken along the line 3—3 of FIG. 2.

Supported upon each section is a depth adjustment system comprising a shaft 64 which is supported to frame members 26 and 28 by pillow block members 66 and 68, respectively. The shafts of sections 12 and 14 are in rearward parallel relationship relative to the shaft on central section 10. For all but the center section the shaft terminates at one end with a lever arm 70 which in turn is pivotally attached to intermediate lever arm 72 which extends downward into attachment with a stabilizer torque bar or spring 78 which, in turn, extends downwardly and rearwardly from a pivot shaft 80 secured to support 22, as is best illustrated in FIG. 3. Rotatably carried on the rearward end of stabilizer bar 78 is an axle 74 which supports a tired wheel 76. The center section includes the above-described pivotal linkage at both ends. Interconnecting adjacent shaft sections are pivotal turnbuckle members 82 which are rotatably supported relative to hinge members 84 and 86 which are fixed to adjacent sectional arm members 88.

Figure 4:
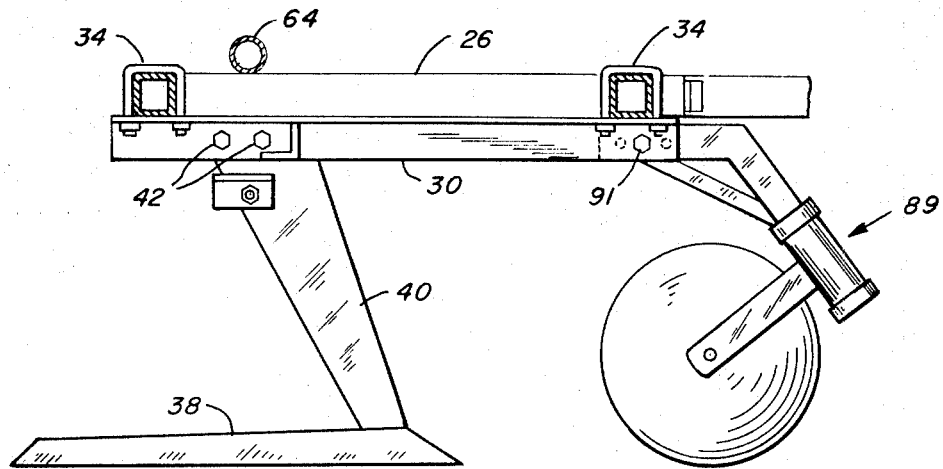
FIG. 4 is a partial cross-sectional view of the apparatus taken along the line 4—4 of FIG. 1.

Referring now to the side elevational view depicted in FIG. 4, the V-shaped plow blade 38 includes a support member 40 held secured between braces 30 and 32 by bolt 42 and is forwardly inclined in order to facilitate removal of vegetation and other debris collected thereon during forward movement of the sweep blade plow assembly.

In some instances it is desirable to provide a coulter attachment which rides centrally forward of the V-shaped plow blade and is best shown in FIG. 4 and identified by the numeral 89. These blades are well known in the art and are provided and attached between support braces 30 and 32 by bolt 91.

Figure 2:
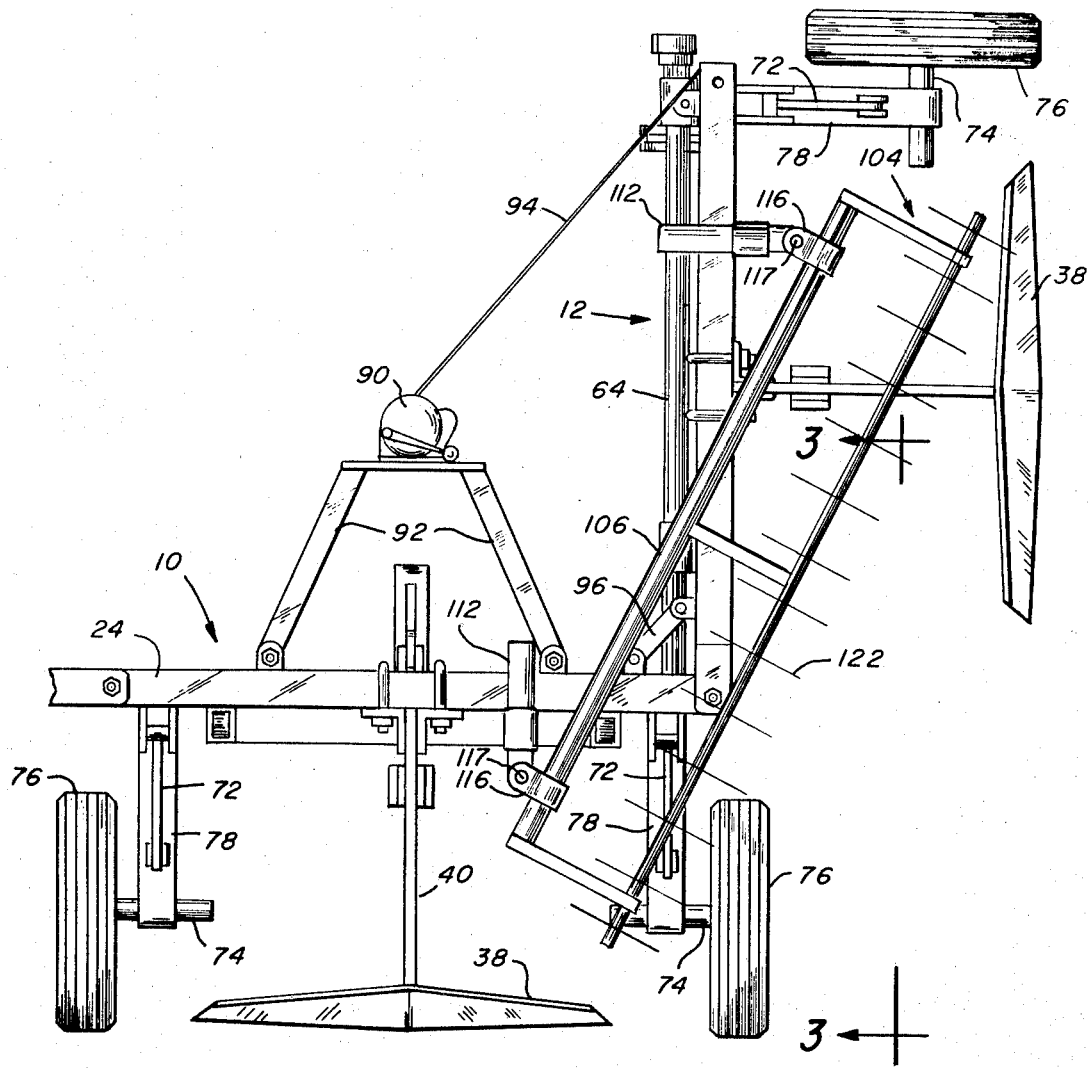
FIG. 2 is a partial cross-sectional view of the apparatus showing the central frame portion thereof and a side section pivoted upwardly into a vertical inoperative position.

Turning now to FIG. 2, a winch assembly 90 carried on support 24 of central section 10 via struts 92 includes a cable 94 employed to raise the side sections from an operational horizontal position to an inoperative vertical position whereupon locking means 96 secures the side section in the vertical position.

Turning now to the rear of the plow assembly and specifically to FIG. 5 of the drawings, slidably received in brackets 98 on support members 24 and extending rearwardly therefrom are elongated laterally spaced extension pipes 100 and 102 of a spur treader mechanism. A spur treader frame 104 having parallel upper and lower shafts 106 and 108 connected by transverse bracing 110 hangs below and is supported by pipes 100 and 102 through linkage members 112 which are received in and suitably retained by pins 114 in sleeves welded to the rear end of the extension pipes and which pivotally carry at the lower ends thereof U-brackets 116 which in turn cooperatively carry upper shaft 106 in a pivotal fashion about a horizontal axis 117. The linkage members 112 contain vertical in-line apertures 118 for adjusting the vertical height of toothed discs 122 of the spur treader mechanism.

As illustrated in FIG. 3, the vertical pivotation of the U-brackets 116 allows the spur treader mechanism to be raised simultaneously with section 12 into the vertical inoperative position. Suitable means, not shown, prevent downward sliding movement of the spur treader frame when so raised.

Rotatably journaled in an independent free wheeling fashion over lower shaft 108 is a plurality of juxtaposed spur treader discs 122 which are formed from a central hub 124 to which is suitably attached a circular portion 120 of sheet stock having peripheral serrated or toothed edge.

The purpose of locating the spur treader mechanism rearward of the plow blade is to enable the spur discs to cut through the earth loosened by the plow blades, thereby breaking up clods of earth and killing vegetation.

It has been discovered that best clod breaking results are attained if the plane of the toothed discs is canted relative to the hub thereby creating a wobble effect during rotation thereof.

The importance of having the frame assembly 104 vertically pivotal about the U-brackets can best be illustrated by reference to FIG. 7. When the spur blades encounter an obstruction such as a rock, which it cannot penetrate, the frame will pivot upwardly to allow the discs to pass thereover without any harm done to the blade. Thus the operation can continue and is not stalled every time an obstruction is encountered.

In operation the mechanism of FIG. 1 is pulled by a connected tractor. If a depth adjustment is necessary, hydraulic control 53 is actuated rotating shafts 64 and the interconnecting linkage to each wheel 76 of each section by reason of the interconnected turnbuckles. Relative adjustment between sections is further provided if desired by lengthening or shortening the turnbuckle so as to make any one section have a relatively different depth adjustment to its adjacent section. In the event it is desired to remove one or more sections for trailering or other reasons, the outer section of sections 12 and 14 are pivoted in a vertical plane that is transversed to the hitch axis. The turnbuckle elements rotate relative to each other. In addition suitable means (not shown) may be installed to lock the wheels in a down position thereby allowing removal of the hydraulic control during trailering or storage of the assembly.

The angle of the axis of rotation of the spur treader discs relative to the forward motion of the mechanism can be easily adjusted by independent telescopic forward-rearward movement of the respective extension pipes 100 and 102.

This invention has been described in preference to specific and preferred embodiments. It will be apparent however that other modifications can be made without departing from the spirit or the scope of the invention, and words used are not words of limitation, but include all equivalent words which operate in a similar manner to accomplish a similar purpose. For example, it is obvious that additional plow sections could be added laterally of sections 12 and 14, and also additional spur treader mechanisms could be added rearward of the one described.

What is claimed is:

1. A tractor drawn sweep plow assembly of the type having a side unit connectable to a central pulling unit, said side unit pivotal from a horizontal operative position to a substantially vertical inoperative position, said side unit and said central unit including:

a horizontal frame;

means attached below said frame to support a sweep type plow blade;

a rotatable shaft on each unit extending horizontally across said units transverse to the normal direction of travel, each shaft in spaced parallel relationship with a shaft on the adjacent connected unit;

at least one ground support wheel for each unit; and means to interconnect said shaft of each unit with a support wheel such that rotation of said shaft pivots said support wheel relative to said frame;

turnbuckle means interconnecting one end of said rotatable shaft on said side unit with one end of said shaft on said central unit whereby support wheels on said units are operatively pivotal simultaneously when said side unit is either in said horizontal or vertical position;

said central pulling unit additionally including a hitch rigidly attached to the forward portion of said frame for connection with a tractor;

a first horizontal support member attached to said hitch extending, transverse to said normal direction of travel, the width of said central pulling unit, a second horizontal suport member rigidly attached to said horizontal frame of said side unit and extending angularly forward to said first horizontal transverse support member for pivotal attachment therewith;

at least one spur treader assembly connected rearwardly of said sweep plow blade comprising:

laterally spaced extension pipes on said sweep blade assembly rearward of said sweep plow blades and cantileverly extending rearwardly therefrom, said pipes being independently longitudinally slidable relative to said sweep blade assembly;

an elongated spur treader support frame traversing between and below said extension pipes and pivotally connected to each of said pipes at the rearward ends thereof, said pivotation being about a horizontal axis; and a plurality of juxtaposed axially aligned spur treader discs rotatably carried by said frame, the axis of rotation being parallel to the longitudinal axis of said support frame, said spur treader discs being positioned relative to said sweep plow blades whereby, upon forward movement of said sweep plow assembly, said spur treader discs rotate to break up clods of earth and, upon said spur treader discs encountering an unpenetrable obstruction, said spur treader frame pivots upwardly allowing said spur treader discs to pass over said obstruction.

2. A tractor drawn sweep plow assembly according to claim 1 including a side unit on each side of central pulling unit.

References Cited
UNITED STATES PATENTS

| | | | |
|---|---|---|---|
| 3,327,787 | 6/1967 | Adee | 172—311 |
| 344,293 | 6/1886 | Tschantz | 172—531 |
| 2,503,993 | 4/1950 | Blomgren | 172—531 |
| 2,828,680 | 4/1958 | Johnson | 172—310 |
| 2,836,111 | 5/1958 | Hobson | 172—531 |
| 2,858,757 | 11/1958 | Davies | 172—601 |
| 2,973,818 | 3/1961 | Marvin | 172—456 |
| 2,974,738 | 3/1961 | Walberg | 172—568 |
| 3,298,446 | 1/1967 | Anderson | 172—401 |
| 3,322,202 | 5/1967 | Sickle et al. | 172—310 |
| 3,470,965 | 10/1969 | Quickstad | 172—456 |

ROBERT E. PULFREY, Primary Examiner

R. T. RADER, Assistant Examiner

U.S. Cl. X.R.

172—196, 548